United States Patent [19]

Hingle

[11] Patent Number: 5,337,437
[45] Date of Patent: Aug. 16, 1994

[54] PORTABLE WASHING APPARATUS

[76] Inventor: Pierre M. Hingle, 215 Good News Ave., Belle Chasse, La. 70037

[21] Appl. No.: 115,593

[22] Filed: Sep. 3, 1993

[51] Int. Cl.$^5$ .............................................. B60S 3/04
[52] U.S. Cl. .................................. 15/104.92; 15/53.1; 15/DIG. 2; 15/97.3; 239/520; 4/615
[58] Field of Search .................... 15/104.92, 97.3, 53.1, 15/53.2, 53.3, 53.4, DIG. 2; 134/123; 230/520, 566, 16, 17; 4/900, 615

[56] References Cited

U.S. PATENT DOCUMENTS

| | | | |
|---|---|---|---|
| 3,089,168 | 5/1963 | Blanford | 15/53.1 |
| 3,402,419 | 9/1968 | Ross | 15/DIG. 2 |
| 3,409,030 | 11/1968 | Schmidt | 134/123 |
| 3,483,572 | 12/1969 | Hallum | 15/302 |
| 4,293,914 | 10/1981 | Van Trang | 15/DIG. 2 |
| 4,912,782 | 4/1990 | Robbins | 239/520 |
| 5,148,570 | 9/1992 | Crotts et al. | 15/97.3 |

*Primary Examiner*—David A. Scherbel
*Assistant Examiner*—Gary K. Graham
*Attorney, Agent, or Firm*—Hugh E. Smith

[57] ABSTRACT

A portable washing apparatus includes a rectangularly-shaped plastic pipe frame structure to which water and soap dispensing devices are attached. Opposed ends of the structure have water dispensers for respectively providing an initial wetting and subsequent rinsing of a child passing through the structure. A soap spray dispenser is provided after the initial wetting dispenser, and a subsequent pair of cloth scrubbers are also interiorly positioned on the structure. A child, either walking or riding a toy vehicle through the structure, is washed by being initially wetted, then sprayed with a soap spray, followed by a cloth scrubbing and a subsequent rinsing. A unique spray buffer system facilitates the creation of a combined liquid curtain and mist for all of the associated liquid dispensers.

3 Claims, 4 Drawing Sheets

PORTABLE WASHING APPARATUS

BACKGROUND OF THE INVENTION

1. Field of the Invention

The present invention relates to cleaning devices and more particularly pertains to a portable washing device which resembles a conventional, commercial automobile washing structure.

2. Description of the Prior Art

The use of self-operated automobile washing devices in the commercial market is well known, and their effectiveness has been established as evidenced by the large number of such facilities in virtually every town in the United States. Inasmuch as children are often fascinated by these commercial car washing operations, it would appear that a market might exist for providing such structures on a smaller portable basis whereby they could be employed as toys as well as a washing means for a child. Since such structures are not presently available in the commercial market, it would appear that there exists a need for such structures and in this respect, the present invention substantially fulfills this need.

SUMMARY OF THE INVENTION

In view of the foregoing disadvantages inherent in the known types of portable washing mechanisms now present in the prior art, the present invention provides an improved portable washing construction wherein the same can be employed as a washing device for both a child and his toy riding device. As such, the general purpose of the present invention, which will be described subsequently in greater detail, is to provide a new and improved portable washing apparatus which has all the advantages of the prior art portable washing apparatuses and none of the disadvantages.

To attain this, the present invention essentially comprises a child washing apparatus which includes a rectangularly-shaped plastic pipe frame structure to which water and soap dispensing devices are attached. Opposed ends of the structure have water dispensers for respectively providing an initial wetting and rinsing of a child passing through the structure. A soap spray dispenser is provided after the initial wetting dispenser, and a subsequent pair of cloth scrubbers are also interiorly positioned on the structure. A child, either walking or riding through the structure, is washed by being initially wetted, then sprayed with a soap spray, followed by a cloth scrubbing, and a subsequent rinsing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable washing apparatus which may be easily and efficiently manufactured and marketed.

It is a further object of the present invention to provide a new and improved portable washing apparatus which is of a durable and reliable construction.

An even further object of the present invention is to provide a new and improved portable washing apparatus which is susceptible of a low cost of manufacture with regard to both materials and labor, and which accordingly is then susceptible of low prices of sale to the consuming public, thereby making such washing apparatuses economically available to the buying public.

Still yet another object of the present invention is to provide a new and improved portable washing apparatus which is simulative in design and structure to a commercial car washing facility.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
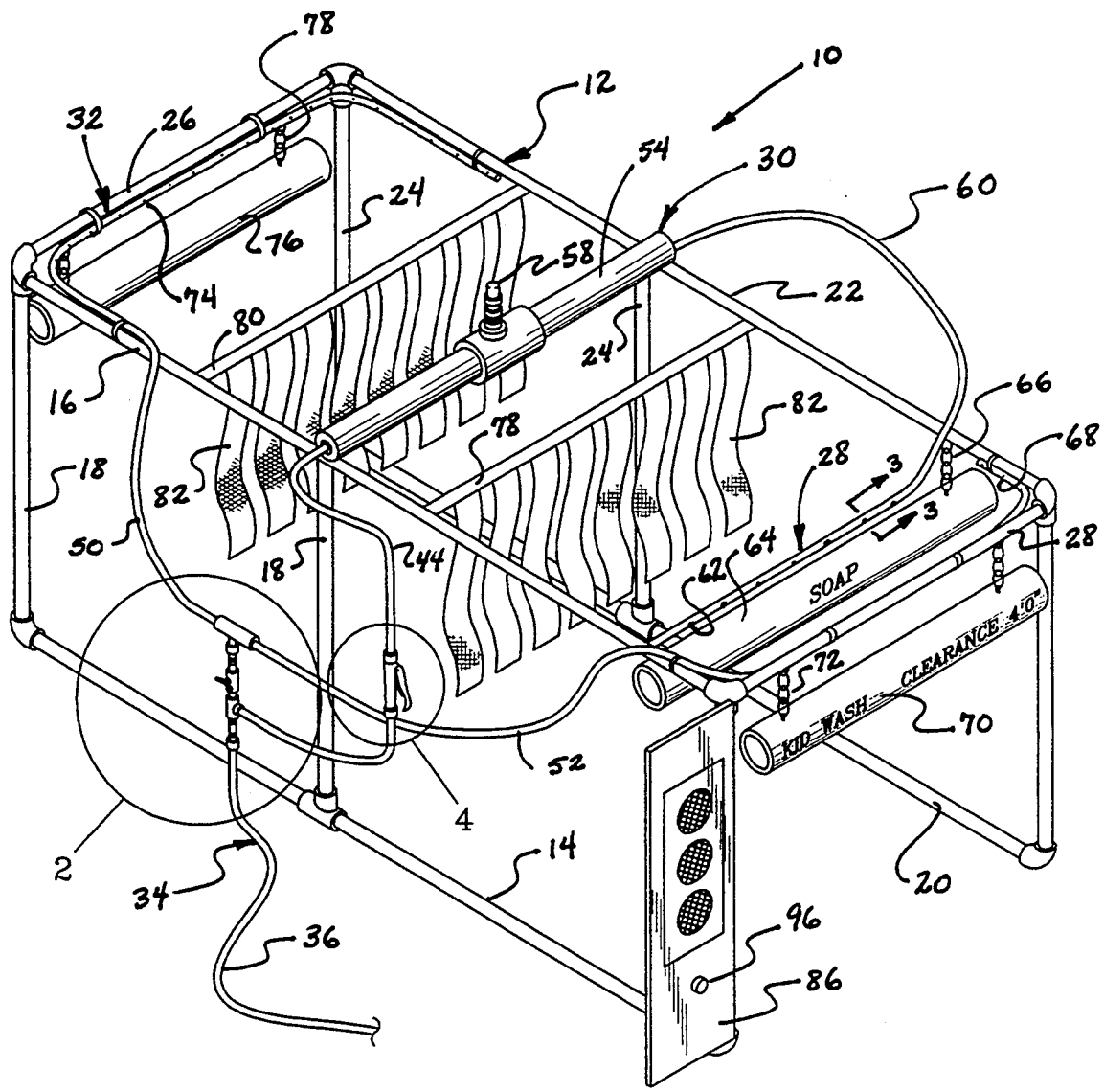
FIG. 1 is a perspective view of the portable washing apparatus comprising in the present invention.

With reference now to the drawings, and in particular to FIG. 1 thereof, a new and improved portable washing apparatus embodying the principles and concepts of the present invention and generally designated by the reference numeral 10 will be described.

More specifically, it will be noted that the apparatus 10 essentially comprises a rectangular support structure 12 which is preferably formed from lightweight plastic tubing such as polyvinyl chloride (PVC). The left side of the structure 12 includes a ground engaging tubular member 14 parallelly aligned with a topmost tubular member 16 and joined thereto by three parallelly aligned upstanding tubular members, all of which are generally designated by the reference numeral 18. The right side of the structure 12 includes a further ground engaging tubular member 20 which is attached to and parallelly aligned with a topmost tubular member 22. The members 20, 22 are similarly connected by upstanding support tubular members, all of which are generally designated by the reference numeral 24. Topmost tubular members 16, 22 are fixably secured together by a pair of parallelly aligned tubular members 26, 28, thereby to define the basic rectangular structural shape of the assembly 12. Attached to the structure 12 is a soap dispensing sprayer assembly 28, a liquid soap supply holder 30, and a rinsing assembly 32. As shown, water is supplied to the sprayer assembly 28, the soap container 30 and the rinsing assembly 32 by a water supply assembly 34.

Figure 2:
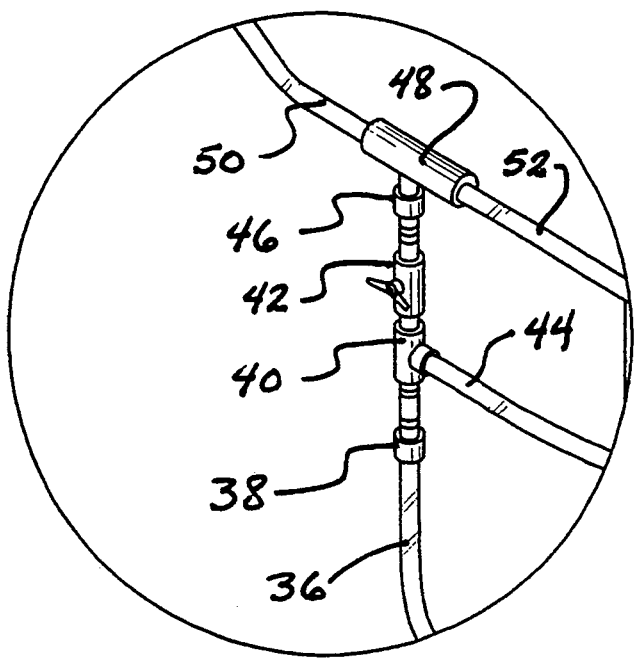
FIG. 2 is an enlarged detail view taken from FIG. 1.

As best shown in FIGS. 1 and 2, the water supply assembly 34 typically comprises a conventional garden hose 30 attached to an available conventional water supply at its unillustrated female end. The male end of the hose 36 is threadably attached to a hose/pipe adapter 38 which in turn is attached to one arm of a conventional plumbing tee 40. A manually operable globe valve 42 is attached to a further arm of the tee 40, and a flexible vinyl tube 44 is attached to the remaining end of the tee. A further adapter 46 is used to connect the globe valve 42 to an additional tee 48 and clear vinyl water supply tubes 50, 52 are attached to the remaining free ends of the second tee.

Figure 3:
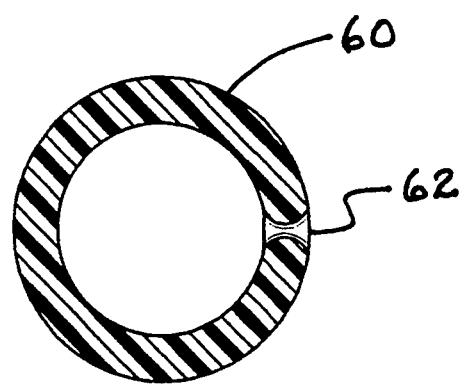
FIG. 3 is a cross-sectional view as viewed along the line 3—3 in FIG. 1.
Figure 4:
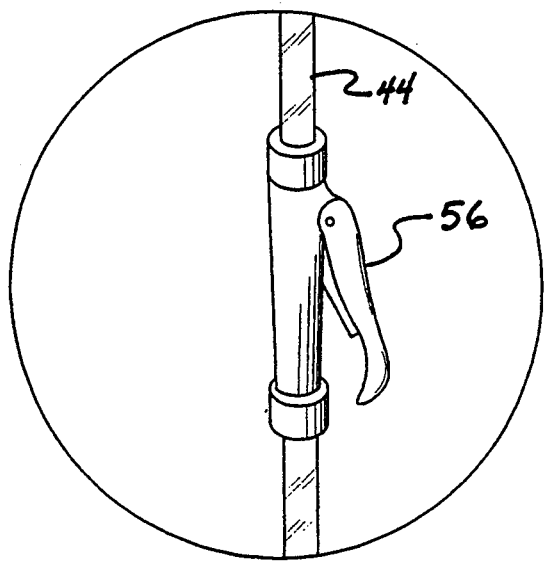
FIG. 4 is an enlarged detail view taken from FIG. 1.

With further reference to FIGS. 1 and 2 of the drawings, it will be seen that the flexible clear vinyl tube 44 is attached to one free end of a cylindrical chamber 54 forming a part of the liquid soap supply holder 30. The cylindrical container 54 has a hollow interior and is designed to be filled with a conventional liquid soap. A manually operated, spring loaded valve 56, as best shown in FIG. 4, is inserted in the tubular conduit 44 so as to allow the selective delivery of water to the cylindrical container 54. A removable cap 58 facilitates the adding of liquid soap to the container 54 when needed, and the water delivered to the container by the conduit 44 allows a water and soap mixture to be created and dispensed therefrom by a further flexible clear vinyl tube 60 which is attached to an opening on an opposed end of the cylindrical container. The flexible tube 60 is provided with a plurality of through-extending apertures 62, as best shown in FIG. 3, on a remote end thereof whereby the combined water and soap mixture can be selectively dispensed from the tube.

With continuing reference to FIG. 1, it will now be understood that the soap dispensing sprayer assembly 28 includes in part the sprayer tubing 60 which is fixably secured by some conventional means between the topmost support tubes 16 and 22. Sprayer assembly 28 further includes a spray buffer tube 64 which is essentially a length of larger diameter PVC tubing suspended beneath the support tubes 16, 22 by two short lengths of chain 66. The spray apertures 62 in the spray tubing 60 are directed to dispense the liquid soap mixture directly onto the large diameter tube 64, and this liquid soap mixture will then flow around the tube and be dispensed downwardly as a liquid curtain as opposed to a fine mist spray. Additionally, some of the liquid soap mixture dispensed from the spray apertures 62 will not impact directly on the buffer 64 but will rather float downwardly as a spray mist, thereby to provide a combined liquid soap curtain and a supportive liquid soap spray mist to thus facilitate a more reliable dispensing of the liquid soap mixture onto a selected object or person. A unique means of adjusting the amount of spray mist relative to the liquid curtain is afforded by changing the lengths of the support chains 66. Shortening the chains 66 will increase the density of the liquid curtain and lessen the amount of spray mist since more of the liquid from the apertures 62 will impact the buffer 64. An opposite result is experienced by lengthening the chains 66. This adjustment system is important since a spray mist is used to thoroughly wet an object in normally inaccessible places, while a liquid curtain provides for a more complete rinsing due to a concentrated high volume flow over an isolated surface. When the high volume flow fails to contact a certain area, the liquid mist will hopefully contact and thus wet the area due to the convection flow of air molecules with which the mist travels.

Figure 6:
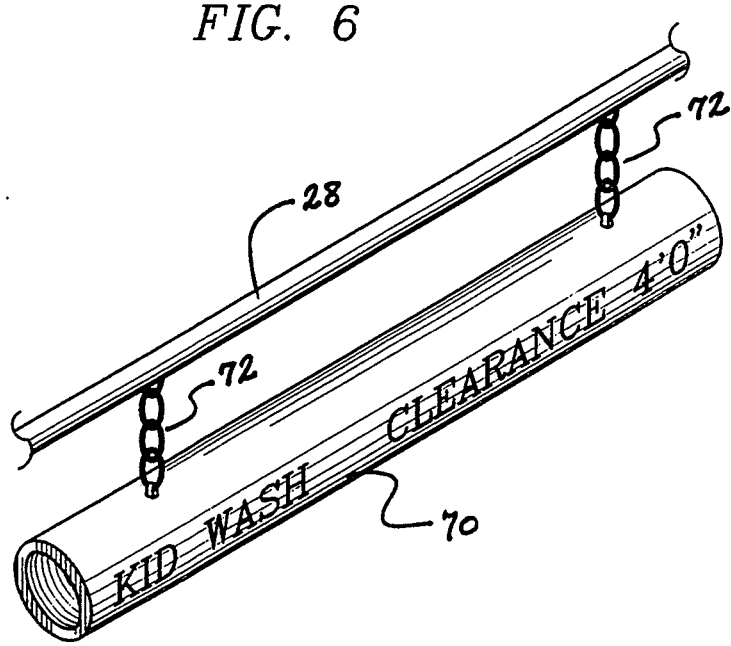
FIG. 6 is an enlarged detail view of a typical spray buffer associated with the present invention.

Referencing again FIGS. 1 and 2, it will be observed that the aforementioned rinsing assembly 32 includes both of the clear vinyl tubes 50, 52. The tube 52 is attached to the cross support tubular member 28 and is provided with a plurality of through-extending spray apertures 68 along a substantial length of the end portion thereof, with some of these apertures facilitating a spray of rinsing water through the open air, with other apertures dispensing water downwardly on a spray buffer 70. The spray buffer 70 is substantially identical to the buffer 64 and, as best illustrated in FIG. 6, includes an enlarged diameter section of PVC tubing which is supported from the tubular member 28 by two flexible lengths of chain, both of which are designated by the reference numeral 72. That portion of the rinse water which impacts the tubular buffer 70 will flow therearound so as to drop downwardly as a water curtain, thereby to supplement the rinsing effect obtained by the spray mist which is created by the remaining spray apertures 68. Appropriate relative adjustment between the liquid curtain and the mist can be obtained by changing the lengths of the support chains 72.

The rinsing assembly 32 also includes a second identical rinsing structure located at a rear end portion of the support structure 12 which is fixably secured to the cross support tubular member 26. In this regard, this additional section of the rinsing assembly 32 includes the clear vinyl flexible tube 50 having a plurality of through-extending apertures 74 along a length of the free end thereof, with water spray emanating from these apertures so as to create both a mist and a water curtain when impacting with a spray buffer 76 attached to the support member 26 by two chains, both of which are designated by the reference numeral 78. The buffer 76 also comprises an enlarged diameter section of PVC tubing and is substantially identical in structure to the buffers 64, 70 as aforedescribed.

Figure 5:
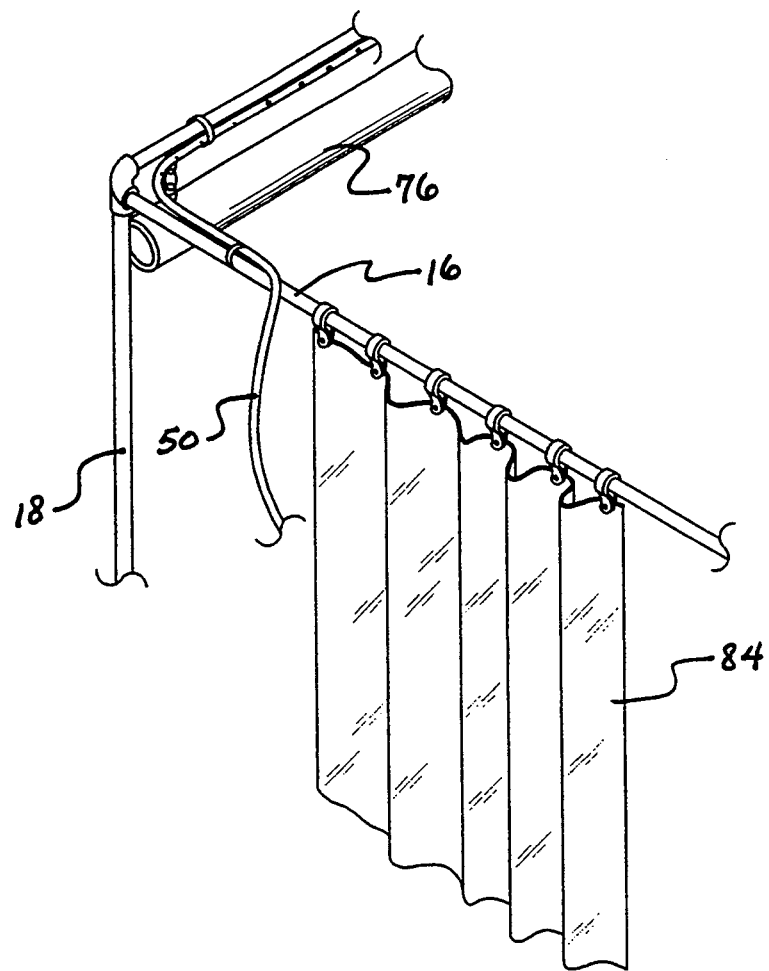
FIG. 5 is a partial perspective detail view illustrating the use of a side curtain with the present invention.

The apparatus 10 further includes a pair of towel racks 78, 80 which are parallelly aligned to each other in a spaced apart relationship and which are respectively fixably secured by some conventional means between the support tubes 16, 22. The towel racks 78, 80 each have a plurality of flexible towel strips 82 attached thereto in a downwardly extending manner. The towel strips 82 can be formed of any conventional material which would facilitate a scrubbing action against an object or person passing thereagainst. Also, as best illustrated in FIG. 5, the topmost support rods 16, 22 can each be provided with a flexible shower curtain structure 84. This flexible curtain structure 84 can be disposed along the entire length of the structure 12, thereby to prevent errant soap and water spray from being dispensed outwardly from the sides thereof. For purposes of illustration, the shower curtain structure 84, which can be selectively attached and removed in a well known manner, has not been illustrated in FIG. 1.

Figure 7:
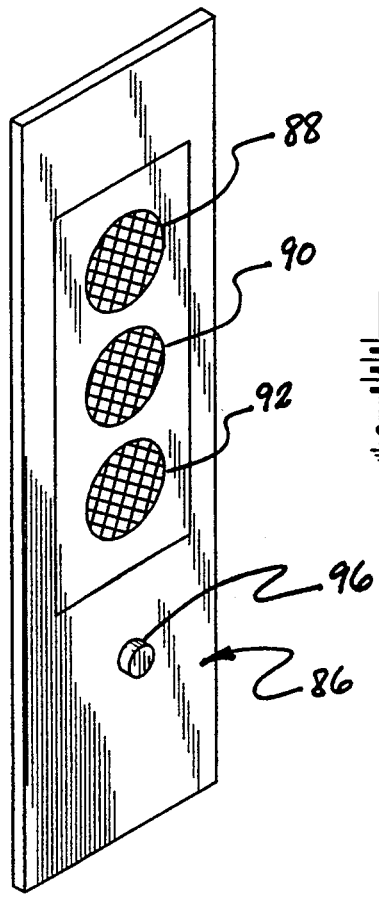
FIG. 7 is a perspective view of the stop light assembly associated with the present invention.
Figure 8:
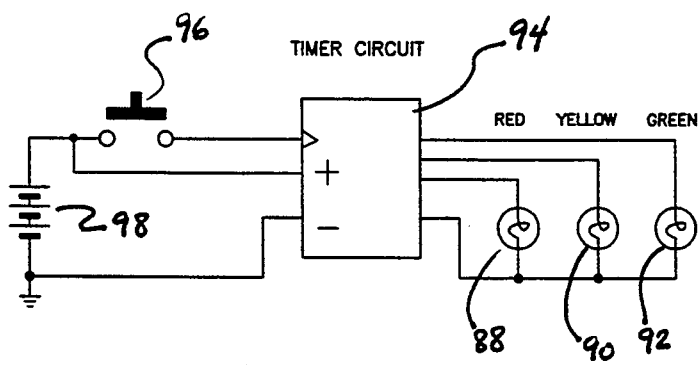
FIG. 8 is an electrical schematic representing the operating circuit for the stop light assembly shown in FIG. 7.

Referencing both FIGS. 1 and 7 concurrently, it can be seen that a stop light assembly 86 may be provided for the enjoyment of a child. The assembly 86 includes a red light 88, a yellow light 90, and a green light 92 which can be operated by a conventional programmable timer circuit 94 as best shown in FIG. 8. In this respect, a manual on-off switch 96 facilitates the supplying of electrical power to the lights 88, 90, 92 from a battery source 98 in a conventional manner.

In operation, a small child can be positioned in front of the structure 12. The switch 96 closes the electrical circuit associated with the lights 88, 90, 92, and the timer circuit 94 will first illuminate the red light 88, followed by the yellow "get ready to enter" light 90 with the final subsequent illumination of the green "go" light 92 whereby the child will begin entering the structure. With water being supplied through the garden hose 36 and the globe valve 42 being open, rinsing water will flow through the vinyl tube 52 so as to be dispensed as a spray mist over the child, as well as a wetting curtain as a result of part of the spray flowing over and around the spray buffer 70.

When the child is sufficiently wet, he or she will move forward until under the buffer 64 and either the child or some other operator can manually operate the valve member 56 to facilitate the dispensing of a liquid soap mixture through the apertures 62 in the vinyl tube 60. Both a liquid soap mist and a liquid soap curtain will be provided over the child due to a portion of the soap mixture being sprayed against the spray buffer 64. When the child is sufficiently wetted with the liquid soap mixture, the valve member 56 can be released so as to cut off the soap mixture supply, and the child can then walk through and impact the hanging towel strips 82. If desired, the child can move back and forth through these towel strips 82 a number of times and can manually position the strips in a scrubbing manner around various portions of his or her body. After a sufficient scrubbing is obtained by the towel strips 82, the child moves forwardly to stand beneath the spray buffer 76 so as to be rinsed by a final water mist spray and curtain, thereby completing the washing operation. As can be appreciated, it is not necessary that a child walk through the washing apparatus 10 since he or she can also ride a tricycle, a toy wagon or some other similar toy so as to facilitate the washing of both the child and the toy vehicle at the same time.

As to the manner of usage and operation of the present invention, the same should now be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable washing apparatus comprising:
   a support structure having a front end and a rear end;
   a first rinsing assembly comprising a first rinsing spray means for dispensing a first rinsing liquid as a mist over an object, said first rinsing assembly being attached to said support structure proximate said front end thereof and fluidly connected to a water supply;
   a soap dispensing assembly comprising a soap dispensing spray means for dispensing a soap liquid as a mist over said object, said soap dispensing assembly being attached to said support structure proximate said first rinsing assembly and fluidly connected to said water supply;
   at least one towel rack having a plurality of downwardly extending, flexible towel strips attached thereto, said towel rack being secured to said support structure proximate said soap dispensing assembly; and,
   a second rinsing assembly comprising a second rinsing spray means for dispensing a second rinsing liquid as a mist over said object, said second rinsing assembly being attached to said support structure proximate said rear end thereof and fluidly connected to said water supply,
   wherein at least one of said spray means is provided with a spray buffer means for converting said liquid into a liquid curtain, said spray buffer means comprising a cylindrical tube member positioned below said at least one of said spray means such that said liquid impacts and flows around said cylindrical tube.

2. The portable washing apparatus as recited in claim 1, wherein said soap dispensing assembly further comprises a liquid soap container in fluid communication with said water supply, and a manually operable valve for regulating a dispensing of said soap liquid to said soap dispensing assembly.

3. The portable washing apparatus as recited in claim 2, and further comprising a stop light assembly secured to said support structure proximate said front end thereof.

* * * * *